(12) United States Patent
Eyers et al.

(10) Patent No.: US 8,690,980 B2
(45) Date of Patent: Apr. 8, 2014

(54) FILTER POCKET ARRANGEMENT WITH INCREASED FILTER MEDIA AREA

(75) Inventors: William Keith Albert Eyers, Surrey (GB); Przemyslaw Krzyszof Nikolin, Berkshire (GB)

(73) Assignee: BHA Altair, LLC, Franklin, TN (US)

( * ) Notice: Subject to any disclaimer, the term of this patent is extended or adjusted under 35 U.S.C. 154(b) by 316 days.

(21) Appl. No.: 12/872,379

(22) Filed: Aug. 31, 2010

(65) Prior Publication Data

US 2012/0047855 A1 Mar. 1, 2012

(51) Int. Cl.
*B01D 46/00* (2006.01)

(52) U.S. Cl.
USPC ............. 55/483; 55/484; 55/378; 55/DIG. 26

(58) Field of Classification Search
USPC ............................ 55/361–382, 483, 492, 521, 55/341.1–341.7, DIG. 2, DIG. 12, DIG. 26; 95/273–287
See application file for complete search history.

(56) References Cited

U.S. PATENT DOCUMENTS

| | | | | |
|---|---|---|---|---|
| 2,607,436 A | * | 8/1952 | Martin | 55/376 |
| 3,710,559 A | * | 1/1973 | Harris et al. | 55/341.1 |
| 3,757,957 A | * | 9/1973 | Smith | 210/486 |
| 3,774,375 A | * | 11/1973 | Smith | 55/382 |
| 3,877,903 A | * | 4/1975 | Peterson | 55/381 |
| 3,951,628 A | * | 4/1976 | Eskijian | 55/300 |
| 4,154,587 A | * | 5/1979 | Gerok | 55/381 |
| 4,300,927 A | | 11/1981 | Day | |
| 4,356,011 A | * | 10/1982 | Day et al. | 55/368 |
| 5,611,830 A | * | 3/1997 | Ernst | 55/378 |
| 5,695,535 A | | 12/1997 | Hintenlang et al. | |
| 6,010,548 A | * | 1/2000 | Burkhead et al. | 55/378 |
| 6,258,142 B1 | | 7/2001 | Holt et al. | |
| 6,524,359 B1 | * | 2/2003 | Kluge | 55/378 |
| 2007/0220851 A1 | * | 9/2007 | Parker et al. | 55/484 |
| 2009/0031682 A1 | * | 2/2009 | Langlands et al. | 55/378 |
| 2009/0107088 A1 | | 4/2009 | Sundvik et al. | |

FOREIGN PATENT DOCUMENTS

| | | |
|---|---|---|
| CA | 2335053 A1 | 1/2000 |
| EP | 1091795 B1 | 4/2003 |

OTHER PUBLICATIONS

AltairSupernova: Filtration System, 2006 Copyright, 4 pages, General Electric Company, GEA-14791, Sep. 2006.
Airguard, Clean-Pak/Venti-Pak: Extended Surface Pocket Filters, 2009 Clamor Air Filtration Products, 4 pages, www.airguard.com.

* cited by examiner

*Primary Examiner* — Duane Smith
*Assistant Examiner* — Thomas McKenzie
(74) *Attorney, Agent, or Firm* — Reinhart Boerner Van Deuren P.C.

(57) ABSTRACT

A filter pocket arrangement that provides increased filter media area is described. In one embodiment, each filter pocket includes a pocket mouth that attaches to a filter frame and a pocket body extending longitudinally away from the pocket mouth to a closed end. The closed end is folded back inward towards the pocket mouth to form a tuck fold that defines a first sub-filter pocket and a second sub-filter pocket at the pocket mouth. The first sub-filter pocket and the second sub-filter pocket each has a sub-pocket mouth that coincides with a portion of the pocket mouth, with sidewalls extending longitudinally therefrom to form an apex at the closed end of the filter pocket. The first sub-filter pocket is separated from the second sub-filter pocket by the tuck fold.

9 Claims, 6 Drawing Sheets

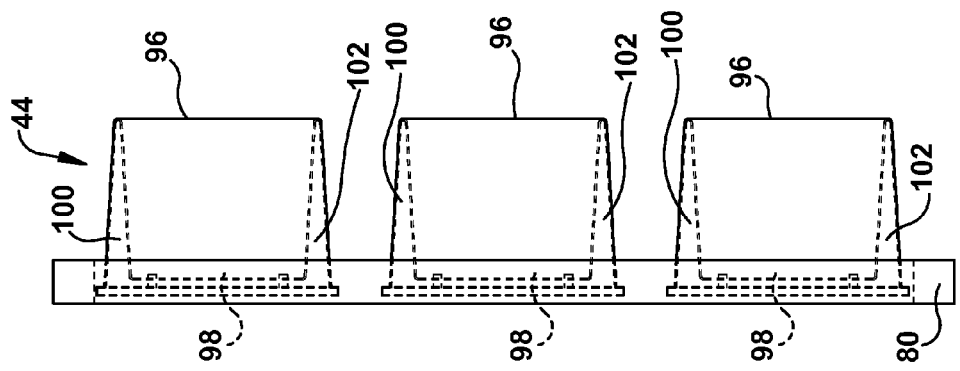
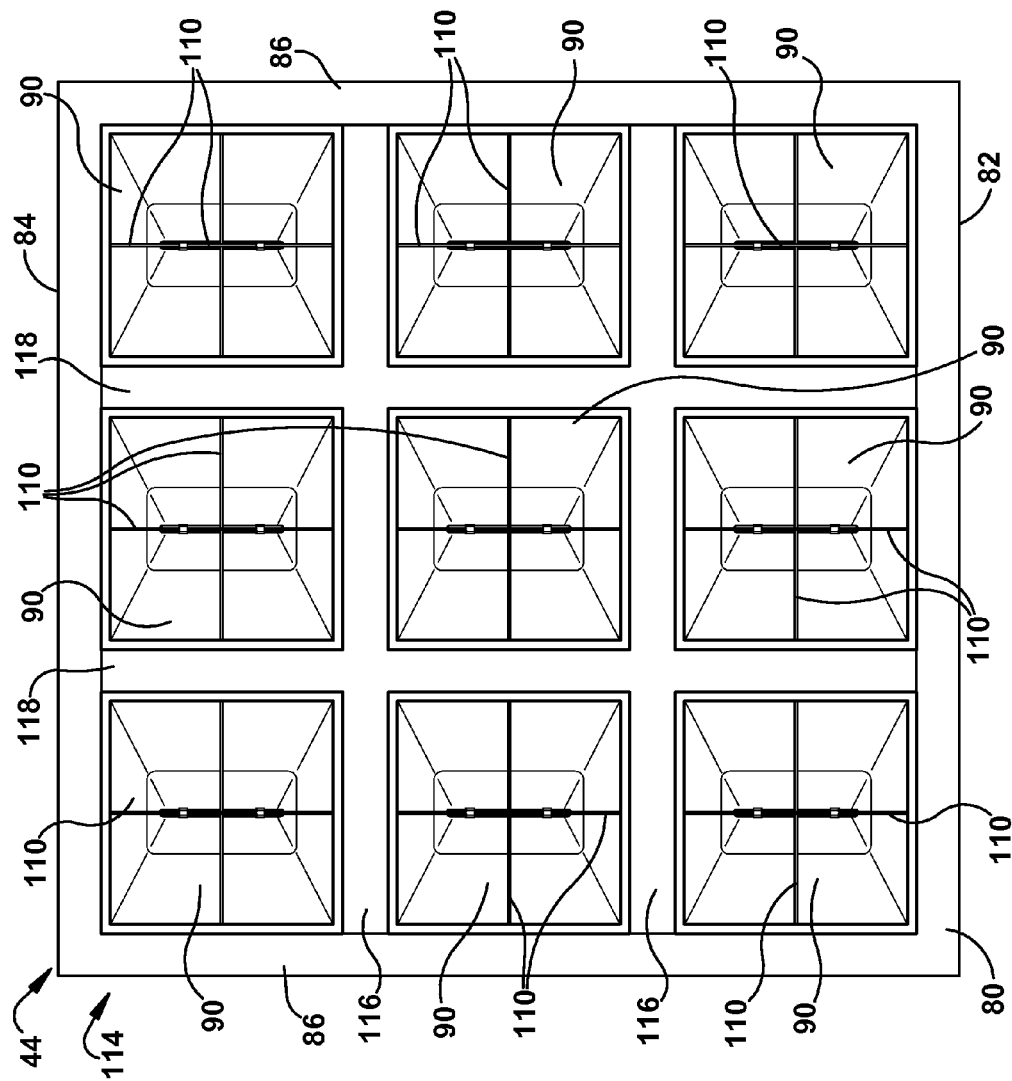

FILTER POCKET ARRANGEMENT WITH INCREASED FILTER MEDIA AREA

BACKGROUND OF THE INVENTION

The present invention relates generally to filtration, and more particularly, to a filter assembly that utilizes a filter pocket arrangement that provides increased filter media area.

Filter assemblies are suitable for use in a multitude of applications. For example, a filter assembly can be used as part of an intake system that provides large quantities of air to a gas turbine for combustion. To maintain suitable performance of the gas turbine, the filter assembly of the intake system filters the intake air to remove unwanted dust, moisture, and other contaminants that can damage components of the gas turbine. Typically, the filter assembly of the intake system utilizes an array of filters to primarily filter the intake air supplied to the gas turbine.

An array of filter pockets is one type of filter assembly that may be used in a gas turbine air intake system. A filter pocket generally has a pair of flat panel filtration media connected together at an apex to form an opening that extends outwardly away from the apex. A typical array of filter pockets includes three or four filter pockets placed in a filter frame. Performance of this type of array of filter pockets is determined generally by the filter media and the size of each pocket (i.e., open area), which essentially corresponds to the surface area of the pocket. Generally, manufacturers try to improve the performance of the array of filter pockets by making the surface area of each pocket deeper, however, the depth that these pockets can be extended are generally limited by the size of the filter housing that the filter pockets are placed in.

BRIEF DESCRIPTION OF THE INVENTION

In one aspect of the present invention, a filter assembly is provided. The filter assembly comprises a filter frame and a plurality of filter pockets disposed in the filter frame. Each of the plurality of filter pockets comprises a pocket mouth that attaches to the filter frame and a pocket body extending longitudinally away from the pocket mouth to a closed end. The closed end is folded back onto itself to form a tuck fold that defines a first sub-filter pocket and a second sub-filter pocket at the pocket mouth. The first sub-filter pocket and the second sub-filter pocket are each located about the pocket mouth and each has a sub-pocket mouth with sidewalls extending longitudinally therefrom to form an apex at the closed end of the filter pocket. The first sub-filter pocket is separated from the second sub-filter pocket by the tuck fold. The filter assembly further comprises a plurality of supporting members that support the plurality of filter pockets within the filter frame. Each of the plurality of supporting members is located about a tuck fold to support at least one of the plurality of filter pockets.

In another aspect of the present invention, a filter pocket arrangement is provided. In this aspect of the present invention, the filter pocket arrangement comprises a filter frame and a plurality of filter pockets disposed in the filter frame. Each of the plurality of filter pockets comprises a pocket mouth that attaches to the filter frame and a pocket body extending longitudinally away from the pocket mouth to a closed end. The closed end is folded back inward towards the pocket mouth to form a tuck fold that defines a first sub-filter pocket and a second sub-filter pocket at the pocket mouth. The first sub-filter pocket and the second sub-filter pocket each has a sub-pocket mouth that coincides with a portion of the pocket mouth, with sidewalls extending longitudinally therefrom to form an apex at the closed end of the filter pocket. The first sub-filter pocket is separated from the second sub-filter pocket by the tuck fold. The filter pocket arrangement further comprises a plurality of supporting members that support the plurality of filter pockets within the filter frame. Each of the plurality of supporting members is located at the tuck fold of at least one of the plurality of filter pockets.

BRIEF DESCRIPTION OF THE DRAWINGS

FIG. 6 is a front elevation view of an alternative embodiment of a filter assembly used in the air intake system illustrated in FIGS. 1-2; and FIG. 7 is a top view of the filter assembly depicted in FIG. 6 according to one embodiment of the present invention.

DETAILED DESCRIPTION OF THE INVENTION

Figure 1:
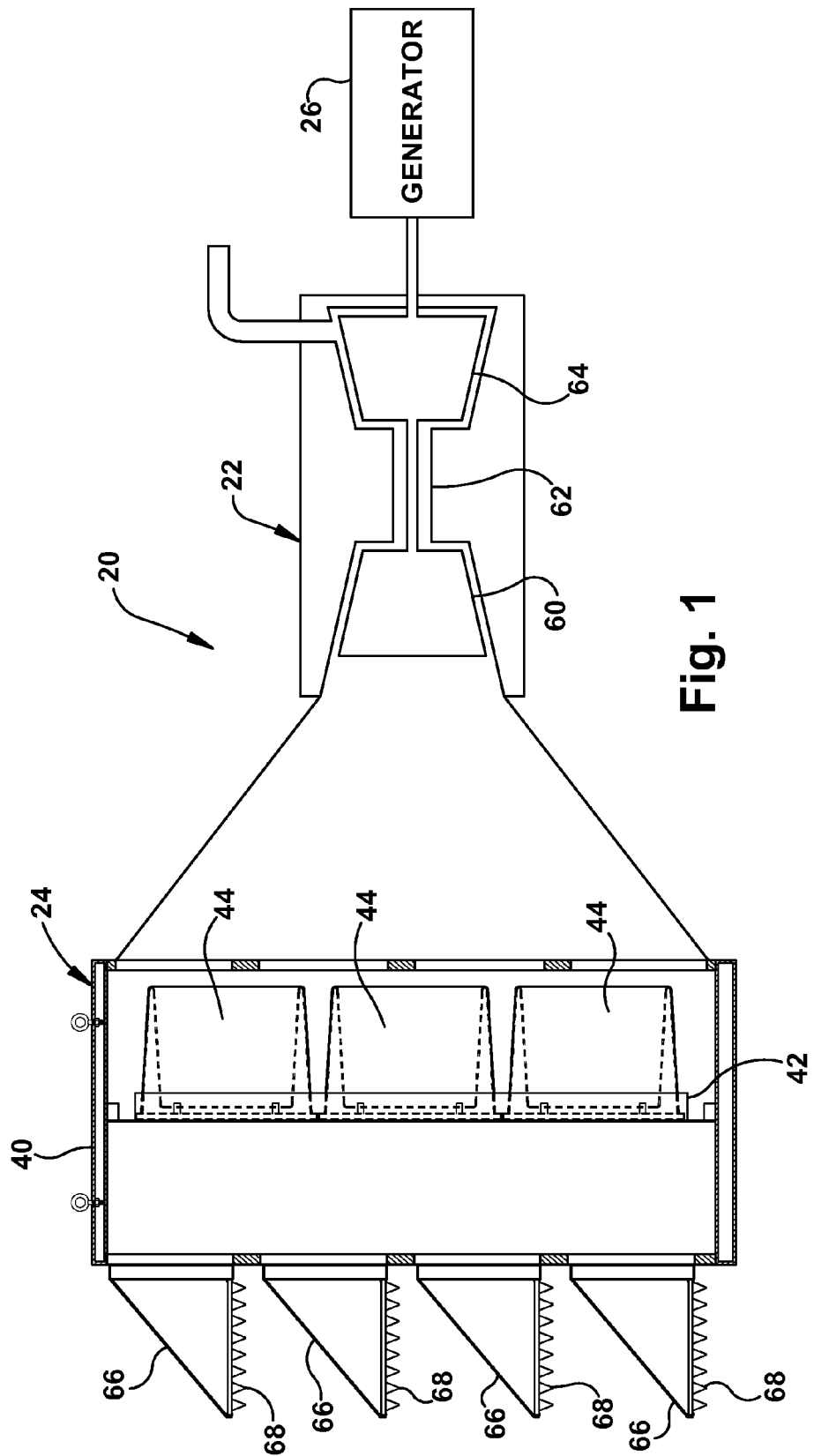
FIG. 1 is a schematic view of a filter assembly, constructed according to one embodiment of the present invention, for use with an air intake system of a gas turbine.

Referring to the drawings, FIG. 1 illustrates a power generation unit 20. The power generation unit 20 includes a gas turbine 22 and an intake air filter system 24. Although the description that follows is directed to a filter assembly used with a gas turbine, various embodiments of the present invention are suitable for use with other turbines, such as for example, steam turbines. Referring back to FIG. 1, air from the surrounding environment is drawn into intake air filter system 24 for filtration and delivery to gas turbine 22. Power generation unit 20 may be used in any of numerous applications, such as, without limitation, generating electrical power by means of a generator 26 or providing motive power, directly or indirectly.

Intake air filter system 24 includes an air intake housing 40. Air intake housing 40 may be made from any suitable material, such as sheet metal. A filter assembly holding frame 42 is disposed in air intake housing 40. Filter assembly holding frame 42 may be made from any suitable material, such as metal tubes, channels, beams or extrusions that are fixed to one another by suitable attachment means such as welding. Filter assembly holding frame 42 supports a plurality of filters or filter assemblies 44, according to one embodiment of the present invention. Filter assemblies 44 remove contaminants such as dust, dirt, moisture, salt, carbon and other contaminants from the air that may tend to reduce the performance or service life of gas turbine 22. In one embodiment, air intake housing 40 may be several stories high, and may contain up to several hundred filter assemblies 44, which may be held by several filter assembly holding frames 42.

As shown in FIG. 1, gas turbine 22 includes an air compressor section 60 that draws intake air into gas turbine 22 for combustion in a combustor section 62 and work in a turbine section 64. The air is drawn first from the surrounding environment through hoods 66 of the air intake housing 40. As the intake air enters air intake housing 40 through hoods 66, it may first pass through a prefilter or a de-mister 68. The air then flows through the array of filter assemblies 44 for primary or final filtration before it is directed to compressor section 60.

Figure 2:
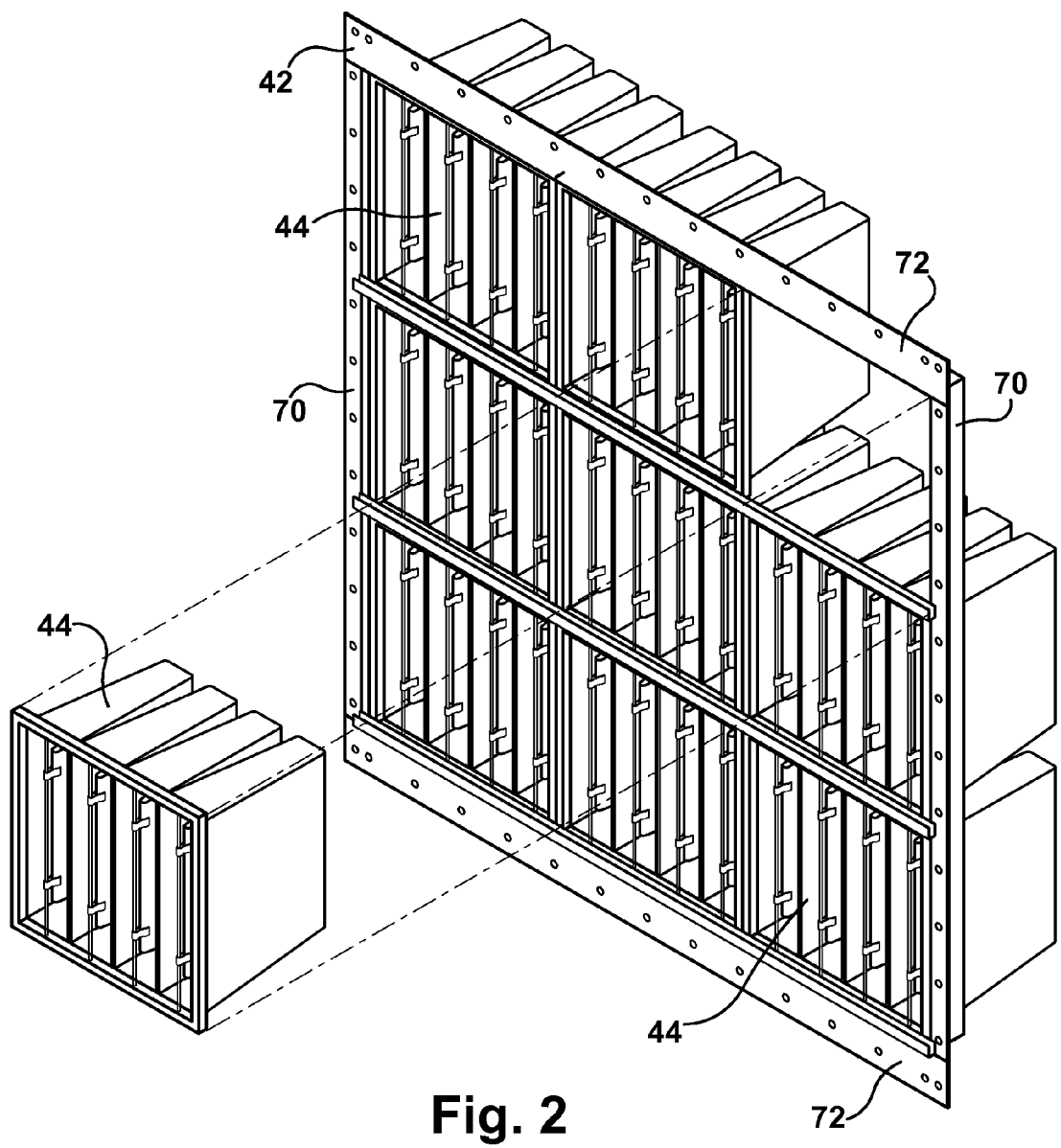
FIG. 2 is an enlarged perspective view of a portion of the air intake system illustrated in FIG. 1 according to one embodiment of the present invention.

As illustrated in FIG. 2, filter assembly holding frame 42 includes a set of vertical supports 70 and horizontal supports 72 that support an array of filter assemblies 44. Filter assemblies 44 may be held in place in filter assembly holding frame 42 by any suitable means, such as clamps or latches (not shown). Filter assemblies 44 may be any suitable filter type, such as for example, filter pockets. In one embodiment, filter assemblies 44 may be constructed as high-efficiency Altair-Supernova™ filters, available from the General Electric Company. Furthermore, filter assemblies 44 may be of any suitable size, construction, configuration or material.

Figure 3:
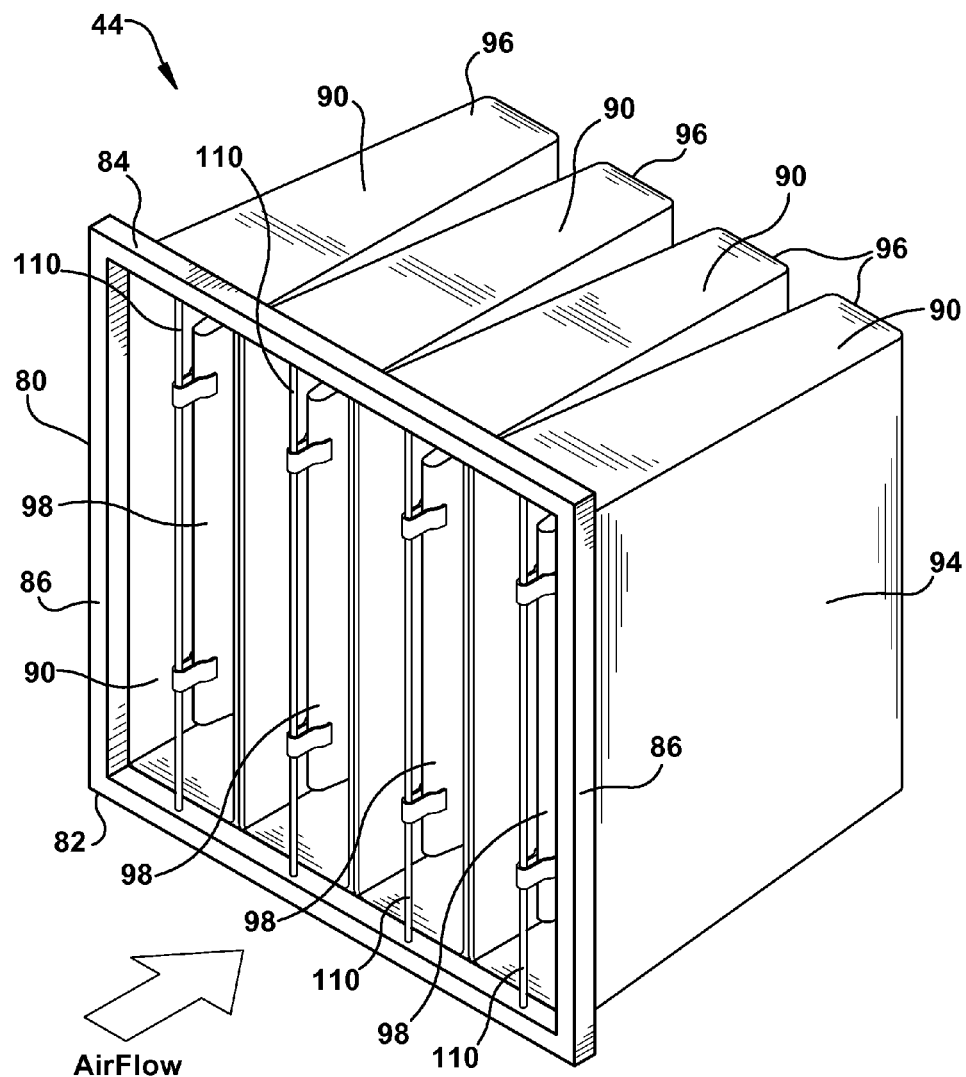
FIG. 3 is a perspective view of one embodiment of a filter assembly used in the air intake system illustrated in FIGS. 1-2.
Figure 4:
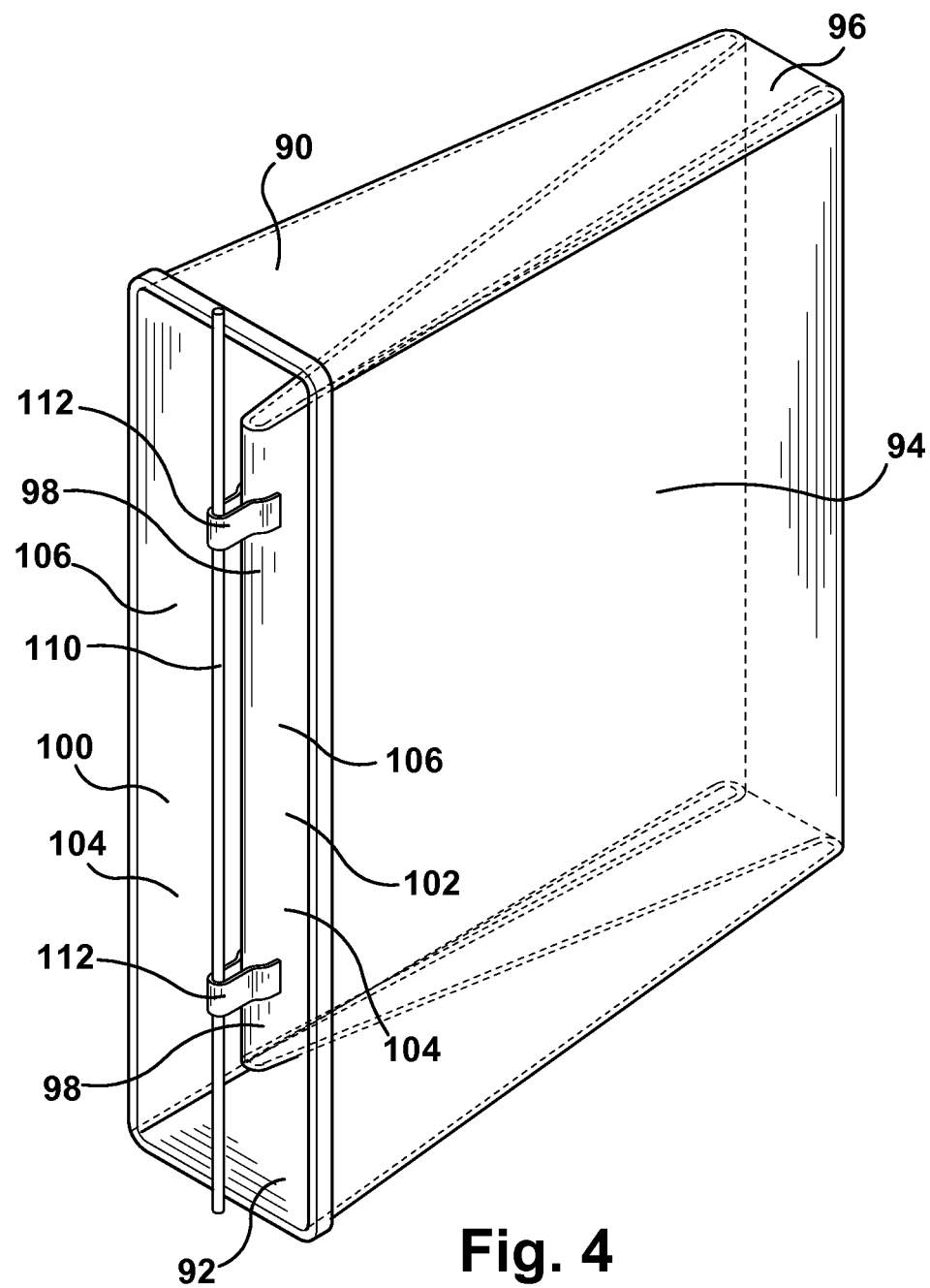
FIG. 4 is a perspective view showing a more detailed view of one filter pocket from the filter assembly of FIG. 3 according to one embodiment of the present invention.
Figure 5:
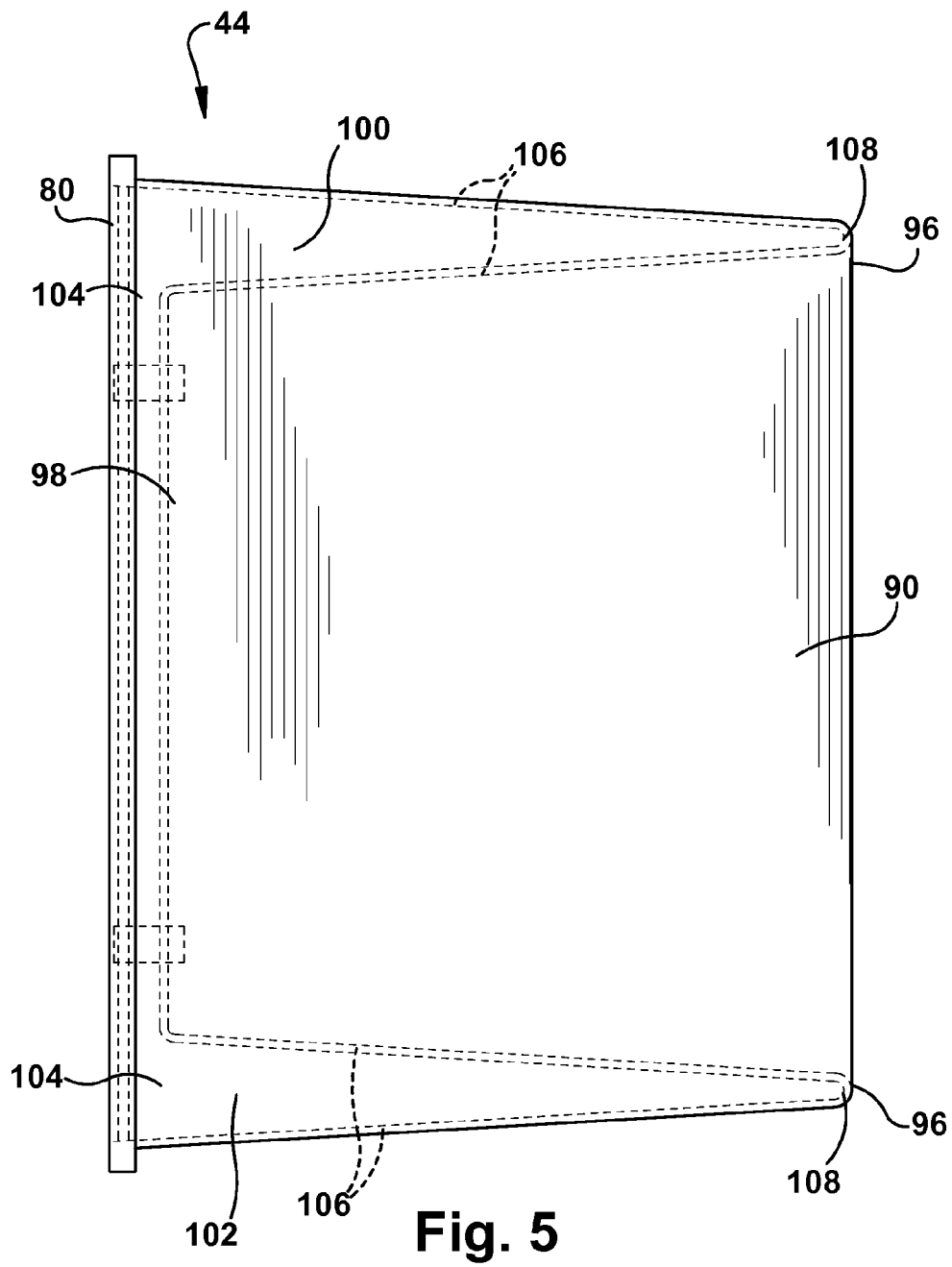
FIG. 5 is a side view of the filter pocket depicted in FIG. 4 according to one embodiment of the present invention.

FIGS. 3-5 provide detailed views of filter assembly 44 according to one embodiment. In particular, FIG. 3 shows a perspective view of filter assembly 44, FIG. 4 shows a detailed view of one filter pocket from filter assembly 44 in FIG. 3, while FIG. 5 shows a side view of the filter pocket depicted in FIG. 4. As shown in FIGS. 3 and 5, filter assembly 44 includes a filter frame 80 constructed according to one embodiment of the present invention. Filter frame 80 mounts filter assembly 44 in filter assembly holding housing frame 42 (FIGS. 1-2). In one embodiment, filter frame 80 is made of injection molded plastic, however those skilled in the art will recognize that other materials may be used. In one embodiment, as shown in FIG. 3, filter frame 80 is rectangular and comprises a bottom portion 82, a top portion 84 and opposing side portions 86. Although not shown in FIG. 3, filter frame 80 may have a flange that is connectible with filter assembly holding frame 42 (FIGS. 1-2) to mount filter assembly 44. In this embodiment, a gasket (not shown) may be disposed around the periphery of the flange and located between filter assembly 44 and filter assembly holding frame 42 to provide an airtight seal between filter assembly 44 and filter assembly holding frame 42.

FIGS. 3-5 shows that filter assembly 44 further comprises filter pockets 90 disposed in filter frame 80 to form a prearranged shape that can take the form of a multitude of shaped-patterns. FIG. 3 shows that filter assembly 44 includes four filter pockets 90, however, those skilled in the art will recognize that more or less filter pockets can be utilized. Each filter pocket 90 comprises a pocket mouth 92 (FIG. 4) that attaches to filter frame 80 and a pocket body 94 extending longitudinally away from the pocket mouth to a closed end 96. Filter pockets 90 are attached to filter frame 80 from behind the frame so that pocket mouths 90 are in the direction of the flow of the air or gas that is to be passed through filter assembly 44 (FIG. 3). Each filter pocket 90 may be attached to filter frame 80 in a number of well-known approaches. For example, in one embodiment, filter pockets 90 may be placed into cooperating portions of filter frame 80 and locked into place by fastening means that can include clipping, latching or clamping mechanisms. Closed end 96 of filter pocket 90 is folded back onto itself to form a tuck fold 98 that defines a first sub-filter pocket 100 (FIGS. 4 and 5) and a second sub-filter pocket 102 (FIGS. 4 and 5) at pocket mouth 92 (FIG. 4). As used herein, a tuck fold is a fold of the filter media created as it is tucked or folded upon itself. As shown in FIGS. 4-5, first sub-filter pocket 100 and second sub-filter pocket 102 each has a sub-pocket mouth 104 located about pocket mouth 92 with sidewalls 106 (FIGS. 4-5) extending longitudinally therefrom to form an apex 108 (FIG. 5) at closed end 96 of filter pocket 90.

Filter assembly 44 further comprises supporting members 110 (FIG. 3) that support filter pockets 90 within filter frame 80. As shown in FIGS. 3-4, each supporting member 110 is located about a tuck fold 98 to support a filter pocket 90. Supporting members 110 may include any one of a number of supporting mechanisms that can provide support for each filter pocket 90 and their respective first sub-filter pocket 100 and second sub-filter pocket 102, so that the filter pockets do not unfold. A non-exhaustive listing of supporting mechanisms that can be used as supporting member includes cylinders, rods, bars, extrusions, etc. In one embodiment, each supporting member 110 extends vertically from bottom portion 82 of filter frame 80 to top portion 84 of filter frame 80 (FIG. 3). In one embodiment, each supporting member 110 is located in front of a tuck fold 98 of a filter pocket 90.

As shown in FIG. 4, there is at least one attachment region 112 that is configured to receive and support at least one supporting member 110. Attachment region 112 may include any one of a number of fastening mechanisms that can be used to fasten or attach tuck folds 98 to supporting members 110, in order to provide enough support to prevent the pockets from unfolding. A non-exhaustive listing of fastening mechanisms that can be used includes tabs, continuous tubes, loops, clips, latches, clamps, etc. In another embodiment, supporting members 110 can be located in back of tuck fold 98 as opposed to being in front of it. In this embodiment, at least one attachment region 112 would be located behind tuck fold 98, so that supporting members would be able to support filter pocket 90 and their respective first sub-filter pocket 100 and second sub-filter pocket 102 from unfolding. In this embodiment, each supporting member 110 would be located between opposing sidewalls 106 of first sub-filter pocket 100 and second sub-filter pocket 102 that extend from a tuck fold 98 of a filter pocket 90.

FIGS. 6-7 show an alternative embodiment for filter assembly 44. In particular, FIG. 6 shows a front elevation view of a filter assembly that takes the form of a matrix, while FIG. 7 shows a top view of the filter assembly depicted in FIG. 6. As shown in FIG. 6, filter frame 80 is partitioned into a matrix 114 having a plurality of rows 116 and columns 118. Each row 116 and column 118 is configured to receive a predetermined number of filter pockets 90. In this embodiment, filter frame 80 may be made of injection molded plastic, however those skilled in the art will recognize that other materials may be used. In this embodiment, each filter pocket 90 located in a row 116 and column 118 of matrix 114 is separate and distinct from each other. In this embodiment, there are supporting members 110 that include horizontally extending supporting members that extend across side portions 86 of filter frame 80 and vertically extending supporting members that extend vertically from bottom portion 82 of filter frame 80 to top portion 84 of filter frame 80. In one embodiment, each horizontally extending supporting member 110 and each vertically extending supporting member 110 maintains at least one filter pocket 90 centered within a respective row 116 and column 118 of matrix 114. The supporting members 110 may include one vertical supporting member and one horizontal supporting member per each filter pocket 90 in a row 116 and column 118 of matrix 114. In another embodiment, there may be one horizontal supporting member for all of the filter pockets in a row 116 and one vertical supporting member for all of the filter pockets in a column 118. A non-exhaustive listing of supporting mechanisms that can be used as supporting members 110 for the horizontal and vertical supporting member includes cylinders, rods, extrusions, etc.

Although not shown in FIGS. 6 and 7, this embodiment would have attachment regions 112 (FIG. 4) that are configured to receive the supporting member 110. In this embodiment, the attachment regions may include any one of a number of fastening mechanisms that can be used to fasten tuck folds 98 to supporting members 110 which will provide enough support to prevent the pockets from unfolding within matrix 114. A non-exhaustive listing of fastening mechanisms that can be used includes tabs, continuous tubes, loops, clips, latches, clamps, etc. Attachment region 112 and accompanying fastening mechanisms can be located in front of or behind tuck fold 98 in order to support filter pockets 90 and their respective first sub-filter pockets 100 and second sub-filter pockets 102, and prevent them from unfolding within matrix 114.

The various embodiments of filter assembly 44 described herein with respect to FIGS. 3-7 may be manufactured according to one of many well-known filter assembly fabrication techniques. For example, filter pockets 90 may be formed from a continuous sheet of porous filtering material with top and bottom edges joined to form pockets 90 and sub-pockets 100 and 102, having apices therebetween pockets in a common plane with filter frame 80. Such an arrangement may be made by bending or folding the continuous sheet of filtering material to an adjacent side of a pocket element and fixing edges and then folding each of the pockets in on itself to form sub-pockets 100 and 102. Pockets 90 and sub-pockets 100 and 102 may be formed by using any well-known technique such as, for example, spot welding, stitching, ultrasound or other means as is known in the art. Alternatively, the individual filter pockets 90 and their respective sub-filter pockets 100 and 102 can be manufactured individually prior to mounting with filter frame 80. This can be achieved by cutting a sheet of filtering material to size. In one embodiment, the cut sheet of filtering material is folded in half and the overlapping side edges are stitched or welded together. This pocket then would be folded in on itself towards pocket mouth 92 to form sub-filter pockets 100 and 102. Edges of sub-filter pockets 100 and 102 could then be stitched or welded together.

It should be apparent that the various embodiments of the present invention result in a filter assembly having filter pockets that are compact and have more surface area than a filter pocket that does not have the aforementioned sub-filter pockets. For example, the surface area of a typical filter assembly constructed from filter pockets having a length L and height H would be equal to [2×L×H]×the number of pockets in the assembly, whereas the surface area of filter assembly 44 constructed from filter pockets 90 having sub-filter pockets 100 and 102 would be equal to [4×L×H]×the number of pockets in the assembly. Thus, filter assembly 44 according to the various embodiments of the present invention would have twice the surface area of conventional filter pocket assemblies, which correlates to improved dust loading and longer life, as well as lower pressure drop across the filter assembly without having to change the space used by the assembly. Because filter assembly 44 according to the various embodiments of the present invention would have more compact filter pockets, these assemblies could fit into more compact filter housings, and thus provide filter assembly manufacturers with potentially more applications of use (e.g., ventilation and separation).

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A filter assembly, comprising:
a filter frame;
a plurality of filter pockets enclosed by the filter frame, each of the plurality of filter pockets comprising a pocket mouth that attaches to the filter frame and a pocket body extending longitudinally away from the pocket mouth to a closed end, wherein the closed end is folded back onto itself to form a tuck fold that defines a first sub-filter pocket and a second sub-filter pocket at the pocket mouth, the first sub-filter pocket and the second sub-filter pocket each having a sub-pocket mouth located about the pocket mouth with sidewalls extending longitudinally therefrom to form an apex at the closed end of the filter pocket, the first sub-filter pocket separated from the second sub-filter pocket by the tuck fold;
a plurality of supporting members each extending vertically from a bottom portion of the filter frame to a top portion of the filter frame, wherein each of the supporting members supports one of the plurality of filter pockets within the filter frame, wherein each supporting member is coincidentally aligned with a tuck fold of a filter pocket to provide support thereof, wherein each supporting member that supports a filter pocket is located between an opening defining a sub-pocket mouth of a first sub-filter pocket in the filter pocket and an opening defining a sub-pocket mouth of a second sub-filter pocket in the filter pocket; and
a plurality of fastening mechanisms each attaching one of the plurality of supporting members to a tuck fold coincidentally aligned thereto, wherein each fastening mechanism has a first portion with direct contact with the supporting member and a second portion with direct contact with a region proximate the tuck fold, the plurality of fastening mechanisms selected from the group consisting of tabs, continuous tubes, loops, clips, latches and clamps.

2. The filter assembly according to claim 1, wherein each supporting member is located in front of the tuck fold of the filter pocket between the opening of the sub-pocket mouth of the first sub-filter pocket in the filter pocket and the opening of the sub-pocket mouth of the second sub-filter pocket in the filter pocket.

3. The filter assembly according to claim 2, wherein each supporting member comprises at least one attachment region that is configured to receive one of the plurality of fastening mechanisms that secure the supporting member to the tuck fold.

4. The filter assembly according to claim 1, wherein the filter frame is partitioned into a matrix having a plurality of rows and columns, each of the plurality of rows and columns configured to receive a predetermined number of the plurality of filter pockets.

5. The filter assembly according to claim 4, wherein each of the plurality of filter pockets located in a row and column of the matrix is separate and distinct from each other.

6. The filter assembly according to claim 1, wherein each of the plurality of filter pockets is disposed in the filter frame to form a prearranged shape.

7. A filter pocket arrangement, comprising:
a filter frame;
a plurality of filter pockets enclosed by the filter frame, each of the plurality of filter pockets comprising a pocket mouth that attaches to the filter frame and a pocket body extending longitudinally away from the pocket mouth to a closed end, wherein the closed end is folded back inward towards the pocket mouth to form a tuck fold that defines a first sub-filter pocket and a second sub-filter pocket at the pocket mouth, the first sub-filter pocket and the second sub-filter pocket each having a sub-pocket mouth that coincides with a portion of the pocket mouth, with sidewalls extending longitudinally therefrom to form an apex at the closed end of the filter pocket, the first sub-filter pocket separated from the second sub-filter pocket by the tuck fold;

a plurality of supporting members each extending vertically from a bottom portion of the filter frame to a top portion of the filter frame, wherein each supporting member supports one of the plurality of filter pockets within the filter frame, wherein each supporting member is coincidentally aligned with and in front of the tuck fold of a filter pocket, wherein each supporting member that supports a filter pocket is located between and in front of an opening defining a sub-pocket mouth of a first sub-filter pocket in the filter pocket and an opening defining a sub-pocket mouth of a second sub-filter pocket in the filter pocket; and a plurality of fastening mechanisms each attaching one of the plurality of supporting members to a tuck fold coincidentally aligned thereto, wherein each fastening mechanism has a first portion with direct contact with the supporting member and a second portion with direct contact with a region proximate the tuck fold, the plurality of fastening mechanisms selected from the group consisting of tabs, continuous tubes, loops, clips, latches and clamps.

8. The filter arrangement according to claim 7, wherein the filter frame is partitioned into a matrix having a plurality of rows and columns, each of the plurality of rows and columns configured to receive a predetermined number of the plurality of filter pockets.

9. The filter arrangement according to claim 8, wherein each of the plurality of filter pockets located in a row and column of the matrix are separate and distinct from each other.

* * * * *

UNITED STATES PATENT AND TRADEMARK OFFICE
CERTIFICATE OF CORRECTION

| | | |
|---|---|---|
| PATENT NO. | : 8,690,980 B2 | Page 1 of 1 |
| APPLICATION NO. | : 12/872379 | |
| DATED | : April 8, 2014 | |
| INVENTOR(S) | : William Keith Albert Eyers and Przemyslaw Krzysztof Nikolin | |

It is certified that error appears in the above-identified patent and that said Letters Patent is hereby corrected as shown below:

Title Page, Item (75) Inventors, second inventor "Przemyslaw Krzyszof Nikolin" should correctly read -- Przemyslaw Krzysztof Nikolin --.

Signed and Sealed this
Second Day of September, 2014

Michelle K. Lee
*Deputy Director of the United States Patent and Trademark Office*